United States Patent
Lukovic et al.

(10) Patent No.: US 11,167,642 B2
(45) Date of Patent: Nov. 9, 2021

(54) CONTROL DEVICE AND METHOD FOR CONTROLLING A FUEL-CELL-BASED MOTOR VEHICLE DRIVE

(71) Applicant: Bayerische Motoren Werke Aktiengesellschaft, Munich (DE)

(72) Inventors: Bozidar Lukovic, Munich (DE); Martin Scherrer, Poing (DE); Danilo Zimmermann, Neufahrn (DE); Jochen Pflueger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 215 days.

(21) Appl. No.: 16/044,267

(22) Filed: Jul. 24, 2018

(65) Prior Publication Data

US 2018/0326866 A1 Nov. 15, 2018

Related U.S. Application Data

(63) Continuation of application No. PCT/EP2017/051126, filed on Jan. 19, 2017.

(30) Foreign Application Priority Data

Jan. 27, 2016 (DE) ...................... 10 2016 201 212.6

(51) Int. Cl.
*B60L 3/00* (2019.01)
*B60L 50/72* (2019.01)
(Continued)

(52) U.S. Cl.
CPC ................. *B60L 3/00* (2013.01); *B60L 50/72* (2019.02); *B60L 58/40* (2019.02); *B60Q 9/00* (2013.01);
(Continued)

(58) Field of Classification Search
CPC ...... B60L 11/1887; B60L 50/72; B60L 58/12; B60L 58/40; B60L 3/00; B60L 2240/62;
(Continued)

(56) References Cited

U.S. PATENT DOCUMENTS 5,808,448 A * 9/1998 Naito ...................... B60L 58/12
322/13
2008/0300729 A1 12/2008 Bono
(Continued)

FOREIGN PATENT DOCUMENTS

CN 102963244 A 3/2013
DE 10 2008 037 064 A1 2/2010
(Continued)

OTHER PUBLICATIONS

PCT/EP2017/051126, International Search Report dated Mar. 28, 2017 (Three (3) pages).
(Continued)

*Primary Examiner* — Aaron L Troost
(74) *Attorney, Agent, or Firm* — Crowell & Moring LLP (57) ABSTRACT

A control device for controlling an electric motor vehicle drive having an electric drive, a first fuel-cell-based energy source, and a second fuel-cell-free energy source, has a human-machine interface for detecting a user input for selecting an operating mode for the motor vehicle drive and a control unit. The control unit is configured to receive a selection signal from the human-machine interface indicating a user input for selecting an operating mode for the motor vehicle drive and to control the motor vehicle drive in accordance with the selection signal to transfer the same into a first operating mode in which the first energy source is operated to supply the electric drive with electrical energy or to transfer the same into a second operating mode in which the first energy source is deactivated and in which the second
(Continued)

energy source is operated to supply the electric drive with electrical energy.

13 Claims, 4 Drawing Sheets

(51) Int. Cl.
*B60L 58/40* (2019.01)
*B60Q 9/00* (2006.01)
*B60L 50/75* (2019.01)

(52) U.S. Cl.
CPC ........... *B60L 50/75* (2019.02); *B60L 2240/62* (2013.01); *B60L 2240/622* (2013.01); *B60L 2250/00* (2013.01); *B60L 2250/10* (2013.01); *B60L 2250/12* (2013.01); *B60L 2250/16* (2013.01); *B60L 2260/26* (2013.01); *B60L 2260/50* (2013.01); *B60L 2260/52* (2013.01); *B60L 2270/12* (2013.01); *Y02T 10/70* (2013.01); *Y02T 10/72* (2013.01); *Y02T 90/16* (2013.01); *Y02T 90/40* (2013.01)

(58) Field of Classification Search
CPC ........... B60L 2240/622; B60L 2250/00; B60L 2250/10; B60L 2250/12; B60L 2250/16; B60L 2260/50; B60L 2260/52; B60L 2270/12; B60L 50/50; B60L 50/75; B60Q 9/00; Y02T 10/7044; Y02T 10/705; Y02T 10/7291; Y02T 90/16; Y02T 90/162; Y02T 90/34; G05D 1/0061
See application file for complete search history.

(56) References Cited

U.S. PATENT DOCUMENTS

| | | | |
|---|---|---|---|
| 2009/0145678 A1* | 6/2009 | Yoshida | H01M 8/04753 180/65.275 |
| 2009/0322503 A1* | 12/2009 | Suzuki | B60W 50/14 340/438 |
| 2016/0252904 A1* | 9/2016 | Sakai | B60W 50/14 701/26 |
| 2017/0028866 A1* | 2/2017 | Miller | B60W 50/14 |

FOREIGN PATENT DOCUMENTS

| | | |
|---|---|---|
| DE | 11 2008 003 648 T5 | 12/2010 |
| DE | 10 2010 011 579 A1 | 9/2011 |
| EP | 1 665 432 B1 | 6/2006 |
| FR | 2 995 839 A1 | 3/2014 |
| JP | 2005-285475 A | 10/2005 |
| JP | 2010-279124 A | 12/2010 |
| WO | WO 01/79012 A2 | 10/2001 |
| WO | WO 2007/015147 A1 | 2/2007 |
| WO | WO 2009/115104 A1 | 9/2009 |

OTHER PUBLICATIONS

German Search Report issued in German counterpart application No. 10 2018 281 212.6 dated Jun. 16, 2016, with Statement of Relevancy (Seven (7) pages).

Chinese Office Action issued in Chinese application No. 201780003712.0 dated Jul. 30, 2020, with English translation (Eighteen (18) pages).

* cited by examiner

CONTROL DEVICE AND METHOD FOR CONTROLLING A FUEL-CELL-BASED MOTOR VEHICLE DRIVE

CROSS REFERENCE TO RELATED APPLICATIONS

This application is a continuation of PCT International Application No. PCT/EP2017/051126, filed Jan. 19, 2017, which claims priority under 35 U.S.C. § 119 from German Patent Application No. 10 2016 201 212.6, filed Jan. 27, 2016, the entire disclosures of which are herein expressly incorporated by reference.

BACKGROUND AND SUMMARY OF THE INVENTION

The present invention relates to a control device and a method for controlling an electric motor vehicle drive, whereby the motor vehicle drive has an electric drive, a first fuel-cell-based electrical energy source and a second fuel-cell-free electrical energy source for feeding the electric drive. Furthermore, the invention relates to a corresponding motor vehicle drive with such a control device.

To supply electric motor vehicle drives with electrical energy, in particular, for passenger vehicles, trucks or buses, various on-board energy sources within the respective motor vehicle are known. Above all, these include so-called high-voltage batteries, in particular, based on lithium-ion secondary cells. Furthermore, the use of fuel cells is also known as sources of electrical energy for motor vehicle drives, in particular, fuel cells, where a reaction of hydrogen with oxygen of the air takes place, resulting in water for the purpose of releasing electrical energy.

While in many vehicles only one type of electrical energy source is used for feeding an electric drive, systems are also known, where various electrical energy sources are used alternatively or jointly for supplying an electric motor vehicle drive.

In this way, in the German publication DE 10 2008 037 064 A1, a switch arrangement to supply an electric motor vehicle drive is described, to which at least two electrical energy sources can be connected. At least one of the at least two electrical energy sources supplies the electric drive at least temporarily by means of at least one actuator. Thereby, the at least one electrical energy source can be disconnected from the electric drive by means of a switch. The respective energy sources can, in particular, be fuel cells, batteries or capacitor sources.

However, there are a series of traffic areas that can be driven on by motor vehicles, in particular traffic areas in enclosed spaces such as parking garages, halls, workshops or tunnels, in which the operation of gas-powered motor vehicle drives, in particular also of fuel-cell drives, is not permitted due to security reasons, above all with regard to possible dangers, which might emanate from the gaseous reactants of chemical reactions taking place in the fuel-cell drive.

The object of the present invention is to provide an improved electric motor vehicle drive with a fuel-cell-based electrical energy source as well as a method for its operation, which both make an expanded field of application of the motor vehicle drive possible.

A first aspect of the invention relates to a control device for controlling an electric motor vehicle drive, having an electric drive, a first fuel-cell-based electrical energy source and a second fuel-cell-free electrical energy source for feeding the electric drive. In this case, the control device has a human-machine interface for detecting a user entry for selecting an operating mode for the motor vehicle drive and a control unit. The control unit is configured to receive a selection signal from the human-machine interface, which indicates a user entry for selecting an operating mode for the motor vehicle drive. It is furthermore configured to control the motor vehicle drive in accordance with the selection signal in order, as an alternative: (i) to transfer it into a first operating mode, in which the first electrical energy source is operated in order to feed the electric drive with electrical energy; or (ii) to transfer it into a second operating mode, in which the first energy source is deactivated and is in a secure state, and in which the second electrical energy source is operated in order to feed the electric drive with electrical energy.

In terms of the invention, under the term "motor vehicle", any type of vehicle is understood, by means of which one or a plurality of people and/or a load can be transported and which has its own drive. In particular, in terms of the invention, a motor vehicle includes a passenger vehicle, a truck, a motor cycle, a bus, or an electric bicycle (e-bike).

In terms of the invention, under the term "electric motor vehicle drive", an electrically operable drive for use as a traction drive of a motor vehicle is understood.

In terms of the invention, under the term "electric drive", a drive arrangement is understood, which has at least one electrically operable actuator to provide a drive power for an electric motor vehicle drive. An electric drive in terms of the invention can have, in particular, one or a plurality of electric motors as (an) actuator(s) for a traction drive of a motor vehicle.

In the terms of invention, under the term "control device", a system, in particular, a so-called "embedded system" is understood, which is provided and set up, via corresponding signals, to control at least another vehicle component, in particular, a motor vehicle drive in terms of a control system or regulation system for the integration into a vehicle, in particular, a motor vehicle. In particular, a control device can also have signal or data inputs and outputs in order to be able, for example, to receive sensor signals or data from other components within the vehicle and be able to control these via corresponding control signals or control data.

In terms of the invention, under the term "control unit", a component of a control device is understood, which is set up to receive data and/or signals and evaluate or further process these and, in particular, depending on this, to generate control signals to control at least one other vehicle component. The control unit can, in particular, be equipped with one or a plurality of processors, on which one or a plurality of computer programs can run, wherein, in turn, the computer program(s) can be stored in a memory. Instead of this or additionally, the control unit can, in particular, also contain "hard-wired" switch logistics.

In terms of the invention, under the term "human-machine interface", a part of a device is understood that is used for the interaction of a user with the device, in particular, in order to make user entries on it and/or to output information to the user. In particular, switches of any type, keyboards and touch-sensitive screens, as well as display devices (e.g., screens or head-up displays) and acoustic or optic signal generators of any kind (in particular, loudspeakers or lighting elements or combinations thereof) or combinations of two or more of the aforementioned elements are each human-machine interfaces.

In terms of the invention, the term "transferring" a motor vehicle drive into a certain operating mode is understood in that the motor vehicle drive from a deactivated state is started in the certain operating mode or, however, is shifted from an operating mode that is already active into the certain operating mode.

The term "secure state" of the first fuel-cell-based electrical energy source is understood to be a state in which this energy source is deactivated and its absorption or emission of gases acting as reactants or products for its fuel-cell operation is interrupted.

In this way, the motor vehicle drive can be electrically supplied in the first operating mode by means of a fuel-cell-based energy source, thereby, in particular, using the available energy density, which is higher in the case of fuel-cell drives in relation to classical battery drives. However, as an alternative to this, it can also be operated in the second operating mode, where it is electrically supplied by means of a fuel-cell-free second energy source while the first energy source is in a secure state. Thereby, in particular, it is possible to also drive on such traffic areas in the second operating mode, where a fuel-cell-based drive is not permitted or is not possible due to other reasons, because, on the one hand, the first fuel-cell-based energy source is not in operation in this operating mode and, on the other hand, it is additionally in a secure state, in which the escape of reaction gases from the fuel cell is prevented. The second operating mode can also be used to increase the range of a vehicle equipped with the motor vehicle drive beyond that of the range that is possible with a given on-board amount of fuel to supply the first energy source's fuel cells. Transferring the motor vehicle drive from one operating mode into another, in particular, from the first operating mode into the second operating mode or vice versa, can be specifically triggered by the user him/herself, in particular, the driver of a vehicle, by means of a corresponding entry on the human-machine interface, in particular, even when both the first energy source as well as the second energy source still have available electrical energy to supply the drive.

In the following, preferred embodiments of the control device and their further embodiments are described that can be combined with each other in any way respectively, as well as be combined with the other aspects of the invention that are described further on, provided that this has not been explicitly ruled out.

According to a first preferred embodiment, the control unit is furthermore configured, in accordance with the selection signal, to control the motor vehicle drive in order to transfer it into a third operating mode, in which the electric drive is not fed by the first nor the second energy source, and the first energy source is operated in order to supply the second energy source with electrical energy. In this way, it is possible to use the fuel-cell-based first energy source in order to supply the second fuel-cell-free energy source with electrical energy, in particular, in order to save the electrical energy supplied in the second energy source in the process to be called upon later if this has an electrical energy storage device. In particular, this can be favorably used in order to increase an amount of energy available in the second energy source at least to the extent that an intended driving on a traffic area, where fuel-cell drives are not permitted, thereby becomes possible. An example for this would be charging a second at least considerably discharged energy source designed as a lithium-ion battery before driving through a parking garage, which has not been approved for fuel-cell drives. According to this embodiment, the human-machine interface allows a selection of at least three operating modes of the motor vehicle drive, namely the first fuel-cell-based operating mode, the second fuel-cell-free operating mode and the third operating mode, which can be referred to as a "stationary charging mode" in accordance with its function.

In accordance with another preferred embodiment, the control unit is furthermore configured to control the motor vehicle drive in the second operating mode in such a way that the power consumption of the electric drive is kept under a predetermined power threshold, which is under the maximum energy supply power of the second electrical energy source. In this way, it is possible to increase the attainable range in the second operating mode. In particular, this is then favorable if the amount of energy to power the electric drive, which the second energy source can provide without recharging, is considerably less than the corresponding amount of energy that the first energy source can provide.

In accordance with another preferred embodiment, the control device is furthermore configured to output the currently selected operating mode to the user by means of the human-machine interface. Outputting can, in particular, take place by means of a corresponding display or a corresponding acoustic and optic signaling. In this way, the current operating mode is signaled to the user in order to make it possible for him/her, via the human-machine interface, to specifically initiate a change into another operating mode based on this information, in particular, a change that is adapted to the current driving situation at hand.

According to another preferred embodiment, the control device is furthermore configured to determine, while the second operating mode is activated, if the available energy content to feed the electric drive remaining in the second energy source has reached a predetermined threshold or has fallen below it, and, if this is determined, a notification of this is respectively output on the human-machine interface and a change into another operating mode is made available as a selection option, in which the second energy source does not act as an energy supplier. Determining this can, in particular, take place by means of measuring a factor relating to the corresponding remaining amount of energy or by means of receiving a signal from another vehicle component indicating such a factor, in particular, from a voltage or charge measurement device coupled with the second energy source or another suitable sensor. The other operating mode is preferably the first or, if applicable, the third operating mode, such as described in the above. In accordance with this embodiment, the user is proactively informed that the motor vehicle drive is in a state, in which a change into another operating mode must be quickly taken in order to make it possible to continue driving, in particular, following a predetermined span of time specifying when notification must be made until the second energy source as an energy supplier is lost.

In accordance with another preferred embodiment, the control device is furthermore configured (i) to generate or receive position data, which indicate a current position, and, based on electronic map material and the position data, to identify a traffic area that cannot be driven on in an active fuel-cell mode according to the map material; (ii) to determine if the current position has approached the identified traffic area according to a predetermined criterion; and (iii) if this is the case, to output a corresponding notification on the human-machine interface, which identifies the approach.

The position data and/or the electronic map material can, in particular, originate from a navigation system, which is part of the control device or transfers this data to the control device. The map data contain information, which identifies the certain traffic areas as not being deemed able to be driven on with an active gas-based drive, in particular a fuel-cell drive. The control device can be set up to determine if the vehicle is approaching the traffic area or if the vehicle has already reached it, in particular, by means of calculating a geometric distance or a remaining driving route from the current position determined in accordance with the position data until reaching such a traffic area, as well as comparing the distance or the driving route with a predetermined threshold. By means of the notification, the driver is made aware of this approach so that he/she can still make a corresponding selection of a suitable operating mode for the motor vehicle drive via the human-machine interface, in particular, a selection of the second or, if applicable, the third operating mode, before driving into the corresponding traffic area.

In accordance with another preferred embodiment, the control device is furthermore configured to detect a motor-start or a motor-stop entry on the human-machine interface and start or stop the electric drive manually or automatically in accordance with such a detected entry. In this way, the entry option to start or stop the electric drive can be combined with the entry option to select an operating mode for the motor vehicle drive within the same human-machine interface, in particular, by means of a touch-sensitive display device, which can be used for both purposes or a combination of corresponding switches compiled into one operating element, preferably pushbutton switches or toggle switches. This makes it easier for the driver to find the corresponding entry options, since they both serve to control the motor vehicle drive and therefore, an adjacent or joint arrangement reduces the cognitive stress of the driver when operating the motor vehicle drive. In turn, this can lead to an increase of driving comfort and driving safety.

A second aspect of the invention relates to an electric motor vehicle drive. It has a control device in accordance with the first aspect of the invention, in particular, in accordance with one or a plurality of its described embodiments, and an electric drive with at least one electric traction motor. Furthermore, the motor vehicle drive has a first fuel-cell-based electrical energy source for feeding the electric drive, a second fuel-cell-free electrical energy source for feeding the electric drive and a safety device to keep the first energy source in a deactivated and secure state.

In accordance with a preferred embodiment, the safety device has at least one safety valve, which is arranged to interrupt an energy carrier's supply to the first energy source if the motor vehicle drive is in the second operating mode. Preferably, such a safety valve can be arranged on the gas supply input of a fuel cell of the first energy source and/or on the output of a fuel tank to supply the second energy source with a gaseous fuel serving as an energy carrier, in particular, with hydrogen gas. In this way, the gas supply to the first energy source is interrupted, therefore interrupting the supply to the at least one fuel cell contained therein, whereby this is deactivated at the same time, and an escape of gases serving as an energy carrier or fuel being transferred within the fuel cell as reactants or products is prevented. Thereby, the safety valves, when transferring into the second operating mode where they are shut, transfer the first energy source into a secure state. In this state, the motor vehicle drive can also be used on traffic areas, in which a gas-operated drive, in particular, a fuel-cell drive is not permitted, not possible due to other reasons, or is not desired.

The preceding statements concerning the control device in accordance with the first aspect of the invention, in particular, concerning its advantages and embodiments, also apply to the motor vehicle drive in accordance with the second aspect of the invention accordingly, which has such a control device.

A third aspect of the invention relates to a method for controlling an electric motor vehicle drive, having an electric drive, a first fuel-cell-based electrical energy source and a second fuel-cell-free electrical energy source for feeding the electric drive. Thereby, the method features the following steps.

Detection, on a human-machine interface, of a user entry for selecting an operating mode for the motor vehicle drive; and controlling a motor vehicle drive in order to select an operating mode for the motor vehicle drive depending on a user entry detected on the human-machine interface, as an alternative (i) to transfer it into a first operating mode, in which the first electrical energy source is operated in order to feed the electric drive with electrical energy; or (ii) to transfer it into a second operating mode, in which the first energy source is deactivated and is in a secure state, and in which the second electrical energy source is operated in order to feed the electric drive with electrical energy.

Preferably, the control device in accordance with the first aspect of the invention can be set up to carry out the method in accordance with the third aspect of the invention, in particular, in accordance with one or a plurality of its embodiments described in the following. These embodiments of the method and their further embodiments can be combined with each other in any way respectively, as well as be combined with the other aspects of the invention that are described further on, provided that this has not been explicitly ruled out. The method corresponds to the control device in accordance with the first aspect of the invention, in particular concerning its advantages and embodiments. Thereby, the statements made there also apply to the method and its embodiment in accordance with the third aspect of the invention accordingly.

According to a first preferred embodiment, if, during the step of detecting, on a human-machine interface, a user entry for selecting an operating mode for the motor vehicle drive, the selection of a third operating mode is determined, during the controlling step, the motor vehicle drive is controlled in order to transfer it into a third operating mode, in which the electric drive is not fed by the first nor the second energy source and the first energy source is operated in order to supply the second energy source with electrical energy.

In accordance with another preferred embodiment, in the second operating mode, the motor vehicle drive is controlled in such a way that the power consumption of the electric drive is kept under a predetermined power threshold, which is under the maximum energy supply power of the second electrical energy source.

In accordance with another preferred embodiment, as another step, the method features an outputting of the currently selected operating mode to the user by means of the human-machine interface.

According to another preferred embodiment, the method has the following other steps: determining, while the second operating mode is activated, if the available energy content to feed the electric drive remaining in the second energy source has reached a predetermined threshold or has fallen below it; and if this is determined, respectively outputting a notification of this on the human-machine interface and making available a selection option for a change into another operating mode, in which the second energy source does not act as an energy supplier. In turn, the other operating mode can, in particular, be the first or, if applicable, the third operating mode.

According to another preferred embodiment, the method has the following other steps: generating or receiving position data, which indicate a current position; identifying, based on electronic map material and the position data, a traffic area that cannot be driven on in an active fuel-cell mode according to the map material; determining if the current position is approaching the identified traffic area according to a predetermined criterion, in particular, if the position has already reached the traffic area; and if this is the case, outputting a corresponding notification, which indicates the approach, on the human-machine interface.

Other advantages, features and application possibilities of the present invention result from the following detailed description in conjunction with the Figures.

Other objects, advantages and novel features of the present invention will become apparent from the following detailed description of one or more preferred embodiments when considered in conjunction with the accompanying drawings.

DETAILED DESCRIPTION OF THE DRAWINGS

In the following Figures, the same reference numbers are consistently used for the same elements of the invention or elements of the invention that correspond to each other.

Figure 1:
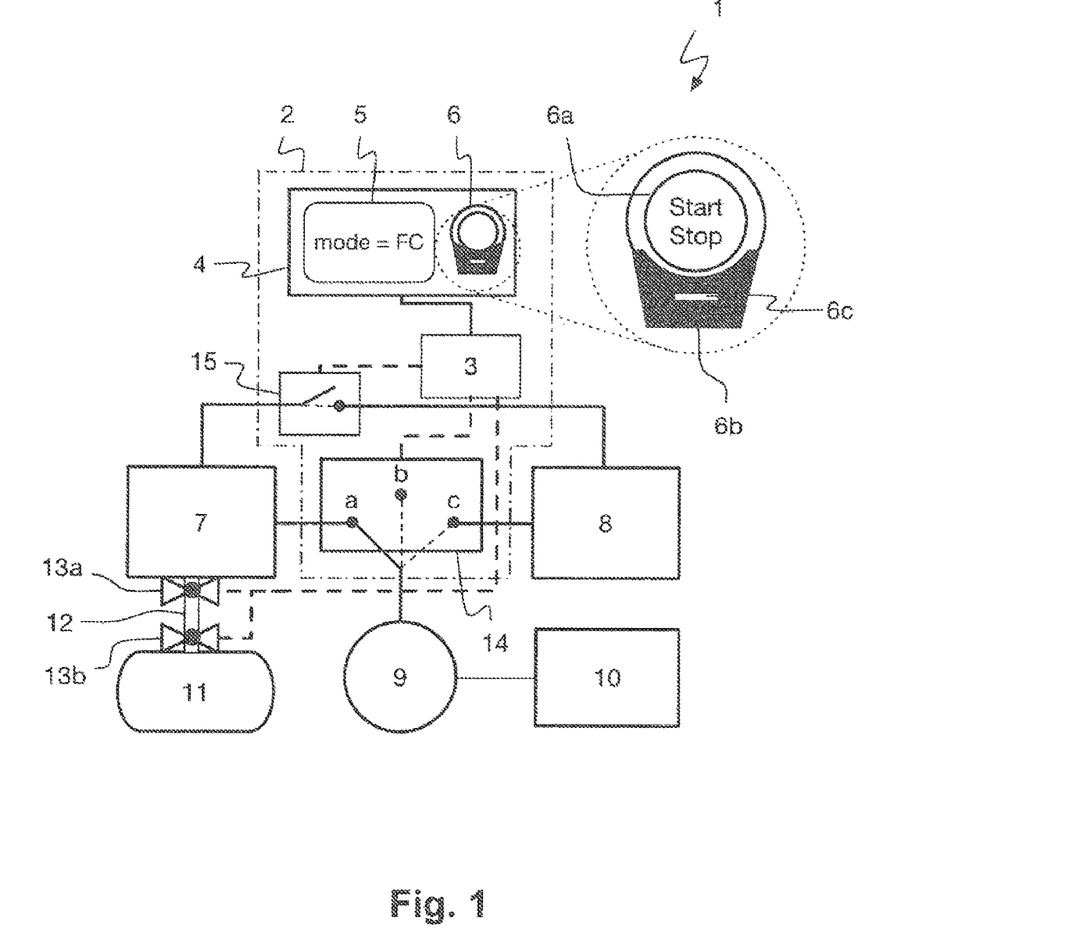
FIG. 1 is a schematic representation of a motor vehicle drive according to one preferred embodiment of the invention.

Initially, reference is made to FIG. 1. There, a motor vehicle drive 1 in accordance with a preferred embodiment of the invention is shown. The motor vehicle drive 1 has a control device 2, a fuel-cell-based first energy source 7, a fuel-cell-free second energy source 8, an electric drive 9 as well as a control unit 10 to control the electric drive 9. The first energy source 7 is supplied with fuel from a fuel tank 11, which can be supplied by a fuel line 12, in particular, for hydrogen. On both ends of the fuel line 12, there are safety valves 13a and 13b, with which the fuel supply to the first energy source 7 can be interrupted. The fuel tank 11 can also be implemented in the form of a tank system made up of a plurality of individual tanks, which can, in particular, be designed to operate at temperatures and/or pressures that are different from each other. The control device 2 contains a human-machine interface 4, which, in turn, has a display device 5, in particular, to display notifications and display the current operating mode of the motor vehicle drive 1 as well as a switch combination 6. As a first operating element, the switch combination 6 has a start-stop switch 6a, which serves to start or to stop the motor vehicle drive 1. In addition, as another entry element, an operating mode switch 6b is arranged, by means of which one of three available operating modes B1, B2, B3 for the motor vehicle drive 1 can be respectively selected. The operating mode switch 6b has three different entry options accordingly, which can be particularly implemented by pressing for various lengths of time, by means of various snap-in positions or other activation options of the operating mode switch 6b. In addition, the switch combination 6, preferably on the operating mode switch 6b, has a display element 6c, which can be used in particular to signal a switch position, for example, by means of various light signals, which can vary from each other in color, how they blink, etc. The control device 2 furthermore has a control unit 3, which is connected to the human-machine interface 4 via a communications link as well as via a switch device made up of two switches 14 and 15 here as an example, which can be controlled by means of the control unit 3 (controls are shown here by means of dashed links) in order to be set into various switching states. The switch 14 serves to connect the electric drive 9 to the first energy source 7 (switch position a) or the second energy source (switch position c) depending on the operating mode B1, B2, or B3 of the motor vehicle drive 1 selected, or, however, to electrically decouple the electric drive 9 from both energy sources 8, 9 (switch position b). The second switch 15 can be implemented as a simple ON/OFF switch, with which an electrical connection between the first and the second energy source can be disconnected or established. In the first operating mode B1, the switch 14 is in switch position a so that the electric drive 9 is supplied with electrical energy from the fuel-cell-based first energy source 7. Simultaneously, the switch 15 is opened. In contrast, in the second operating mode B2, the switch 14 is in switch position c so that the electric drive 9 is now supplied with electrical energy from the fuel-cell-free second energy source 8. In turn, here, the switch 15 is also opened. In the third operating mode B3, which can be referred to as the "stationary charging mode", the switch 14 is in the open switch position b, in which it does not couple the first nor the second energy source to the electric drive 9. The electric drive 9 is therefore deactivated and thereby de-energized in this operating mode. Now, however, the switch 15 is closed so that the first energy source 7 can be operated in order to charge the second energy source 8, which is designed as an accumulator, in particular a lithium-ion cell-based accumulator, by means of the closed connection established by the switch 15. By means of a corresponding control by the control unit 3, the safety valves 13a and 13b are shut in the third operating mode B3 so that the first energy source is in a secure state, in which the fuel supply from the fuel tank 11 is interrupted. In particular, by means of the safety valve 13a, the output of the fuel tank 11 is also sealed so that this as well as the fuel line 12 are also in a secure state.

Figure 2:
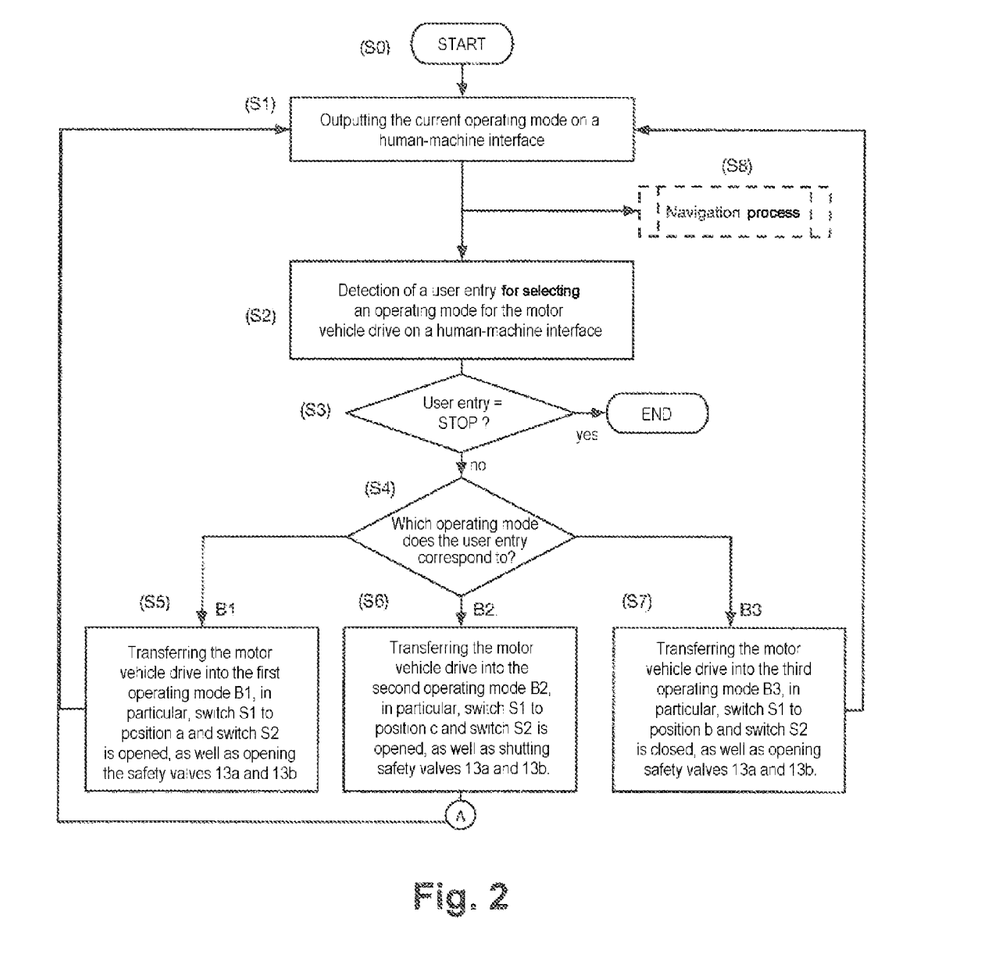
FIG. 2 is a flow chart to illustrate a preferred embodiment of the method according to the invention.

Now, reference is made to FIG. 2. There, a preferred embodiment of the method according to the invention is shown, which should now be explained, thereby making reference to the motor vehicle drive in FIG. 1 as an example.

In a first step S0 on the start-stop switch 6a, the method begins with a user entry, by means of which the motor vehicle drive 1 is started. In another step S1, the current operating mode B1, B2 or B3 is output on the human-machine interface 4 according to the setting of the last entry(ies) on the operating mode switch 6b, in particular, displayed on the display device 5. As an alternative to this, a certain operating mode can also be defined as a standard operating mode, which is activated independently of the last operating mode or a certain setting of the operating mode switch 6b when starting the motor vehicle drive 1. In particular, this is useful if the operating mode switch 6b does not have any different fixed switch positions so that its original state is always the same at the beginning of the method. The latter can particularly be the case if the various operating modes can be selected solely by a pressing on the operating mode switch 6b for various periods of time without this remaining in a certain setting, in particular, snapping into it.

In another step S2, a user entry to select an operating mode for the motor vehicle drive 1 is detected on the human-machine interface 4. Simultaneously, in parallel to this, an optional navigation process S8 is started, which will be explained in detail in the following making reference to FIG. 4.

In another step S3, a verification is made of if another user entry to stop the motor vehicle drive 1 has taken place by means of the start-stop switch 6a. If this is the case, the method is terminated. Otherwise, the method goes on to step S4, in which it is determined, which operating mode the user entry that took place at step S2 corresponds to. If this user entry corresponds to an entry to select a first operating mode B1, the motor vehicle drive 1 is transferred into this first operating mode B1, whereby, in particular, the switch 14 is set to switch position a and the switch 15 is opened. In contrast, if the user entry corresponds to a selection of a second operating mode B2, in step S6, a transfer of the motor vehicle drive 1 into this second operating mode B2 takes place, whereby, in particular, the switch 14 is set to switch position c and the switch 15 is opened. In contrast, if the user entry corresponds to a selection of the third operating mode B3, in step S7, the motor vehicle drive is transferred into this third operating mode B3, whereby, in particular, the switch 14 is set to switch position b and the switch 15 is closed.

Figure 3:
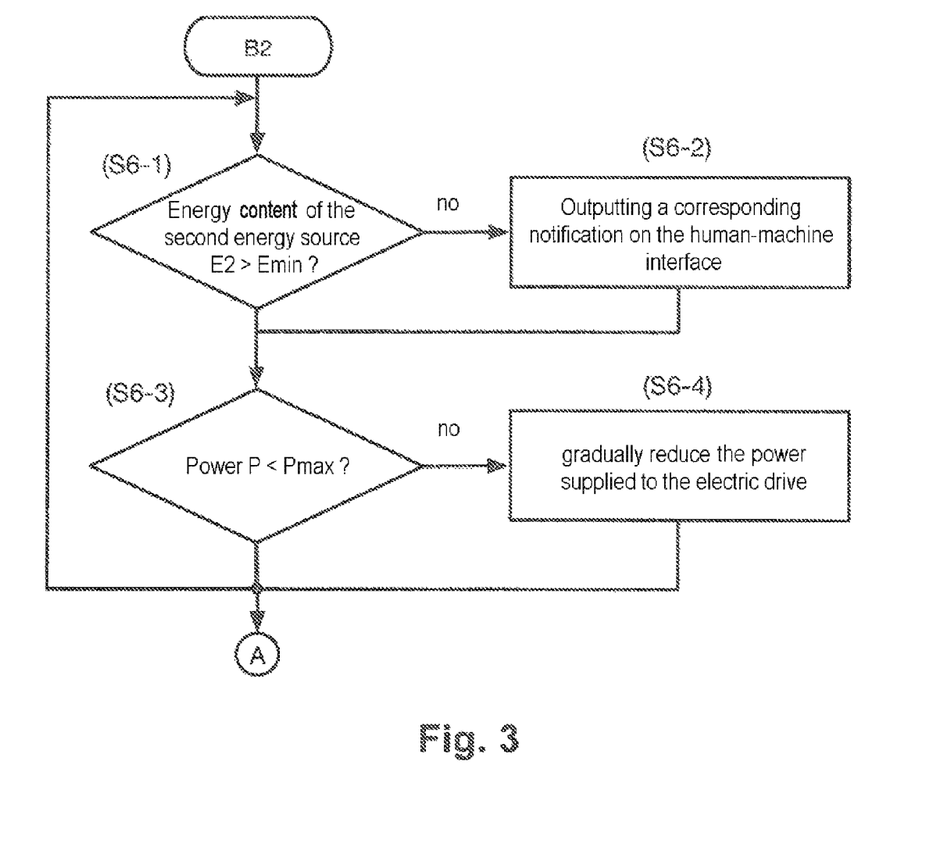
FIG. 3 is a flow chart to illustrate a preferred embodiment of an optional process as part of the method according to the invention that serves to control the motor vehicle drive in the second fuel-cell-free operating mode.

In FIG. 3, a preferred embodiment of an optional process is shown as part of the method in FIG. 2, which serves to control the motor vehicle drive in the second fuel-cell-free operating mode B2. The method steps shown in FIG. 3 represent substeps of the method step S6 in FIG. 2 according to this. In a first substep S6-1, it is checked if the energy content $E_2$ of the second energy source is greater than a predetermined minimum amount of energy $E_{min}$. If this is the case (S6-1; yes) so that the second energy source still has sufficient energy to continue to power the motor vehicle drive 1, the method proceeds to substep S6-3, otherwise (S6-1; no), it is branched off into another substep S6-2. In substep S6-2, on the human-machine interface, a notification is output, by means of which the driver or the user are signaled that the second operating mode will soon no longer be available and then it proceeds to substep S6-3. In substep S6-3, it is checked if the power consumption of the electric drive 9 is under a predetermined power threshold $P_{max}$. If that is the case (S6-3; yes), in accordance with FIG. 2, step S1 is branched back to. Otherwise (S6-3; no) the power supplied to the electric drive is still reduced beforehand, in particular, by means of a gradual reduction. In parallel to branching back to step S1, the process shown in FIG. 3 is continued until the end of the second operating mode B2 in a loop-like manner.

Figure 4:
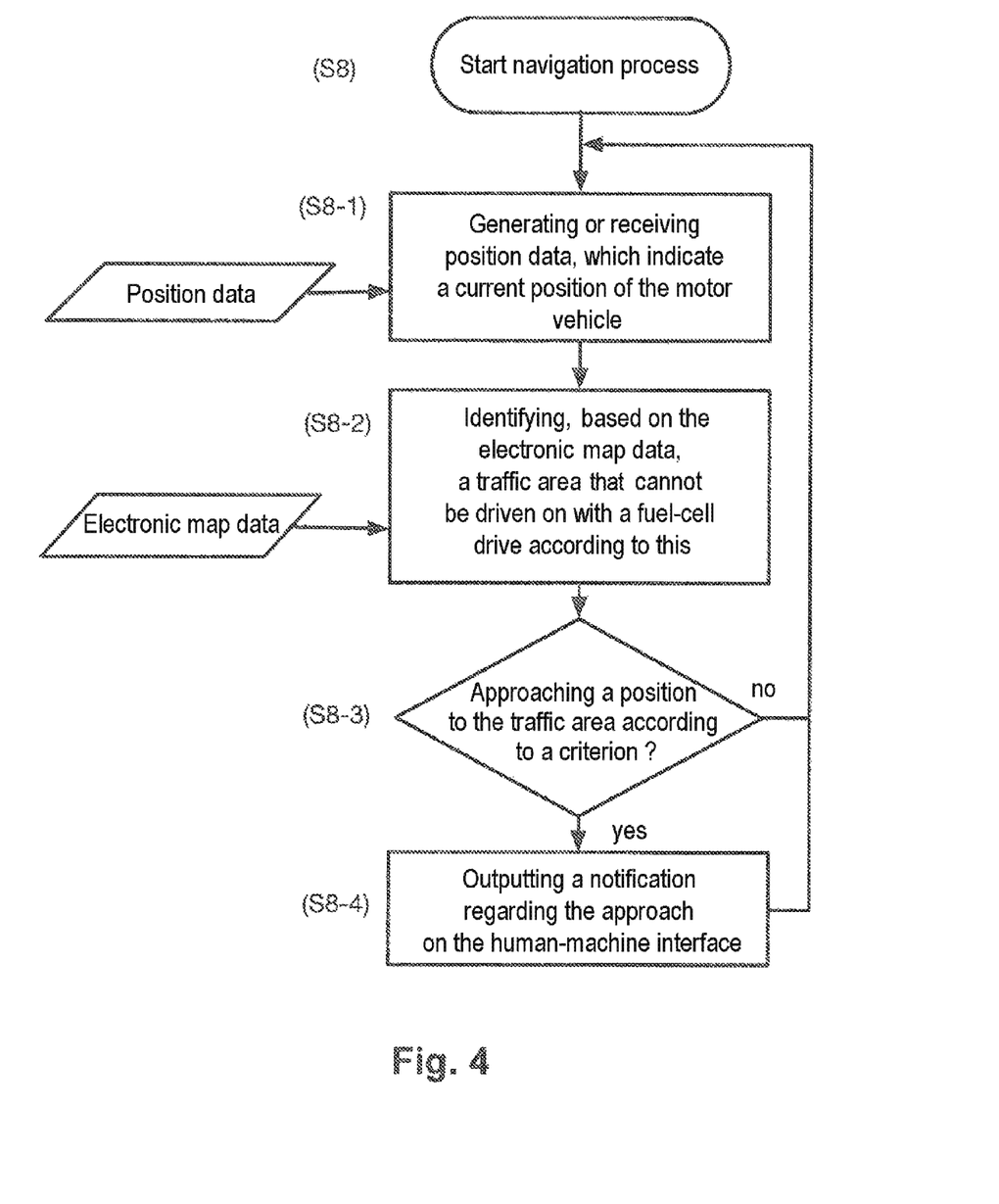
FIG. 4 is a flow chart to illustrate a preferred embodiment of an optional navigation process as part of the method according to the invention that serves to control the motor vehicle drive in the second fuel-cell-free operating mode.

FIG. 4 shows an optional navigation process S8, as shown in FIG. 1, in greater detail in accordance with a preferred embodiment. Thereby, position data that indicate a current position of the vehicle equipped with the motor vehicle drive 1, are generated by the control unit itself in a first substep S8-1 or are received by a position determination device, in particular, one that is external to the drive. In another substep S8-2, electronic map data are received and based upon these data, one or a plurality of traffic areas are identified, which cannot be driven on using a gas or fuel-cell drive according to the map data. Receiving the electronic map data can also alternatively take place at the same time as the position data is received in step S8-1. In a subsequent step S8-3, a verification is made of if the current position has approached one of the traffic areas identified during step S8-2 in accordance with a predetermined criterion, in particular, a distance criterion, such as a remaining stretch of road or a geometrical distance. If this is not the case (S8-3; no), the process branches back to the substep S8-1. Otherwise (S8-3; yes), i.e., if such an approach has been determined during step S8-3, an output of a corresponding notification for the driver takes place on the human-machine interface 4, thereby indicating that a corresponding traffic area is located in the proximity or, in particular, will soon be driven on so that the driver is reminded to switch into another permissible operating mode, in particular, into the operating mode B2, in a timely manner prior to driving on the traffic area. The process S8 is continuously repeated and runs in parallel to the main process in accordance with FIG. 2.

While, in the preceding, at least one exemplary embodiment has been described, it must be noted that a great number of variations concerning this exist. Thereby, it must also be noted that the described exemplary embodiments only represent non-limiting examples, and is not intended by means of this to limit the scope, the applicability or the configuration of the devices and methods described here. Rather, the preceding description should provide the person skilled in the art with instructions for the implementation of at least one exemplary embodiment, wherein it is understood that various changes in the function and arrangement of the elements described in an exemplary embodiment can be performed without deviating from the subject respectively defined in the enclosed claims as well as the legitimate equivalents thereof.

REFERENCE LIST

1 motor vehicle drive
2 control device
3 control unit
4 human-machine interface
5 display device
6 switch combination
6a start-stop switch
6b operating mode switch
6c display element
7 first fuel-cell-based energy source
8 second fuel-cell-free energy source
9 electric drive
10 control device for electric drive
11 fuel tank for first energy source
12 fuel line
13a, b safety valves
14 first switch
15 second switch The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for controlling an electric motor vehicle drive, wherein the electric motor vehicle drive has an electric drive, a first fuel-cell-based electrical energy source, and a second fuel-cell-free electrical energy source, comprising:

a human-machine interface, wherein the human-machine interface detects an entry by a user made on an operating mode switch for selecting at least a first operating mode and a second operating mode for the electric motor vehicle drive, wherein in the first operating mode the first fuel-cell-based electrical energy source is operated in order to feed the electric drive with electrical energy and wherein in the second operating mode the first fuel-cell-based electrical energy source is deactivated and is in a secure state and the second fuel-cell-free electrical energy source is operated in order to feed the electric drive with electrical energy; and a control unit, wherein the control unit is configured to receive a selection signal from the human-machine interface which indicates the user entry and to control the electric motor vehicle drive in accordance with the selection signal in order to:
transfer the electric motor vehicle drive into the first operating mode in which the first fuel-cell-based electrical energy source is operated in order to feed the electric drive with electrical energy; or
transfer the electric motor vehicle drive into the second operating mode in which the first fuel-cell-based electrical energy source is deactivated and is in the secure state and in which the second fuel-cell-free electrical energy source is operated in order to feed the electric drive with electrical energy;
wherein the control device is configured to:
generate or receive position data which indicates a current position of a motor vehicle in which the electric motor vehicle drive is disposed;
based on electronic map material and the position data, identify a traffic area that cannot be driven on in an active fuel-cell mode;
determine if the current position has approached the identified traffic area according to a predetermined criterion; and
if determined, output a notification on the human-machine interface to prompt the user to switch, when in the first operating mode, from the first operating mode into the second operating mode, and when the user switches from the first operating mode into the second operating mode, shut a safety valve to interrupt a fuel supply to the first fuel-cell-based electrical energy source to transfer the first fuel-cell-based electrical energy source to the deactivated and secure state.

2. The control device as claimed in claim 1, wherein the control unit is further configured to, in accordance with the selection signal, control the electric motor vehicle drive in order to transfer the electric motor vehicle drive into a third operating mode in which the electric drive is not fed by the first fuel-cell-based electrical energy source nor the second fuel-cell-free electrical energy source and the first fuel-cell-based electrical energy source is operated to supply the second fuel-cell-free electrical energy source with electrical energy.

3. The control device as claimed in claim 1, wherein the control unit is further configured to control the electric motor vehicle drive in the second operating mode such that a power consumption of the electric drive is kept under a predetermined power threshold which is under a maximum energy supply power of the second fuel-cell-free electrical energy source.

4. The control device as claimed in claim 1, wherein the control device is further configured to output a currently selected operating mode by the human-machine interface.

5. The control device as claimed in claim 1, wherein the control unit is further configured to:
determine, while the second operating mode is activated, if an available energy content to feed the electric drive remaining in the second fuel-cell-free electrical energy source has reached a predetermined threshold or has fallen below the predetermined threshold and, if determined that the available energy content has reached the predetermined threshold or has fallen below the predetermined threshold, output a notification on the human-machine interface and make available a selection option for a change into another operating mode in which the second fuel-cell-free electrical energy source does not act as an energy supplier.

6. The control device as claimed in claim 1, wherein the control device is further configured to detect a motor-start or a motor-stop entry on the human-machine interface and to respectively start or stop the electric drive manually or automatically.

7. An electric motor vehicle drive, comprising:
the control device as claimed in claim 1;
an electric drive with an electric traction motor;
a first fuel-cell-based electrical energy source for feeding the electric drive with electrical energy;
a second fuel-cell-free electrical energy source for feeding the electric drive with electrical energy; and
a safety device, wherein the safety device keeps the first fuel-cell-based electrical energy source in a deactivated and secure state.

8. The electric motor vehicle drive as claimed in claim 7, wherein the safety device has a safety valve which interrupts a fuel supply to the first fuel-cell-based electrical energy source if the electric motor vehicle drive is in the second operating mode.

9. A method for controlling an electric motor vehicle drive, wherein the electric motor vehicle drive has an electric drive, a first fuel-cell-based electrical energy source, and a second fuel-cell-free electrical energy source, comprising the acts of:
detecting, on a human-machine interface, an entry by a user made on an operating mode switch for selecting at least a first operating mode and a second operating mode for the electric motor vehicle drive, wherein in the first operating mode the first fuel-cell-based electrical energy source is operated in order to feed the electric drive with electrical energy and wherein in the second operating mode the first fuel-cell-based electrical energy source is deactivated and is in a secure state and the second fuel-cell-free electrical energy source is operated in order to feed the electric drive with electrical energy;
receiving a selection signal from the human-machine interface which indicates the user entry by a control unit; and
controlling the electric motor vehicle drive by the control unit in accordance with the selection signal in order to:
transfer the electric motor vehicle drive into the first operating mode in which the first fuel-cell-based electrical energy source is operated in order to feed the electric drive with electrical energy; or
transfer the electric motor vehicle drive into the second operating mode in which the first fuel-cell-based electrical energy source is deactivated and is in the secure state and in which the second fuel-cell-free electrical energy source is operated in order to feed the electric drive with electrical energy,
and further comprising the acts of:

generating or receiving position data which indicates a current position of a motor vehicle in which the electric motor vehicle drive is disposed;

based on electronic map material and the position data, identifying a traffic area that cannot be driven on in an active fuel-cell mode;

determining if the current position has approached the identified traffic area according to a predetermined criterion; and if determined, outputting a notification on the human-machine interface to prompt the user to switch, when in the first operating mode, from the first operating mode into the second operating mode, and when the user switches from the first operating mode into the second operating mode, shutting a safety valve to interrupt a fuel supply to the first fuel-cell-based electrical energy source to transfer the first fuel-cell-based electrical energy source to the deactivated and secure state.

10. The method as claimed in claim 9, further comprising the act of:

controlling the electric motor vehicle drive by the control unit in accordance with the selection signal in order to transfer the electric motor vehicle drive into a third operating mode in which the electric drive is not fed by the first fuel-cell-based electrical energy source nor the second fuel-cell-free electrical energy source and the first fuel-cell-based electrical energy source is operated to supply the second fuel-cell-free electrical energy source with electrical energy.

11. The method as claimed in claim 9, wherein, in the second operating mode, the electric motor vehicle drive is controlled such that a power consumption of the electric drive is kept under a predetermined power threshold which is under a maximum energy supply power of the second fuel-cell-free electrical energy source.

12. The method as claimed in claim 9 further comprising the act of outputting a currently selected operating mode by the human-machine interface.

13. The method as claimed in claim 9 further comprising the acts of:

determining, while the second operating mode is activated, if an available energy content to feed the electric drive remaining in the second fuel-cell-free electrical energy source has reached a predetermined threshold or has fallen below the predetermined threshold; and if determined that the available energy content has reached the predetermined threshold or has fallen below the predetermined threshold, outputting a notification on the human-machine interface and making available a selection option for a change into another operating mode in which the second fuel-cell-free electrical energy source does not act as an energy supplier.

* * * * *